Oct. 2, 1951     W. P. MANSFIELD ET AL     2,570,036
TWO-CYCLE INTERNAL-COMBUSTION ENGINE WITH EXHAUST GAS TURBINE
Filed April 23, 1945     10 Sheets-Sheet 1

Inventors
W. P. Mansfield
J. White

Oct. 2, 1951     W. P. MANSFIELD ET AL     2,570,036
TWO-CYCLE INTERNAL-COMBUSTION ENGINE WITH EXHAUST GAS TURBINE
Filed April 23, 1945     10 Sheets-Sheet 2
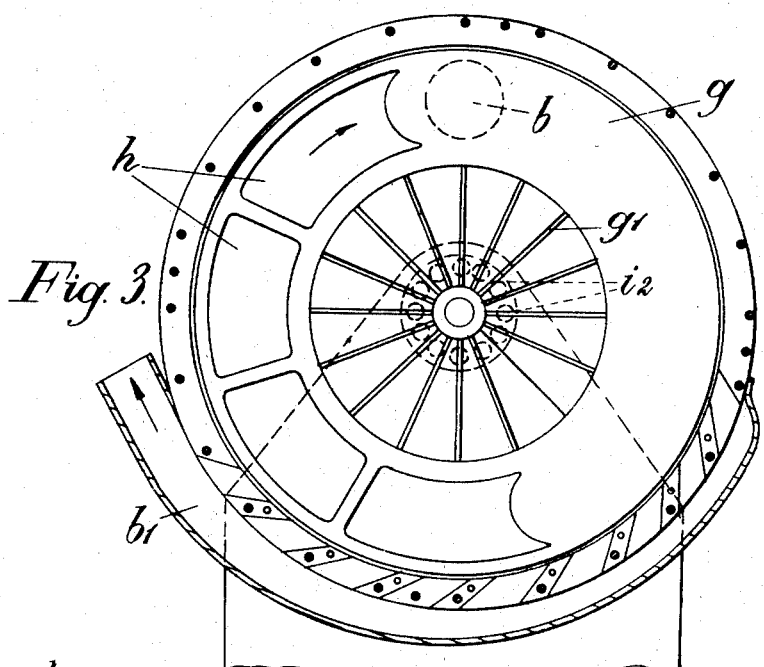
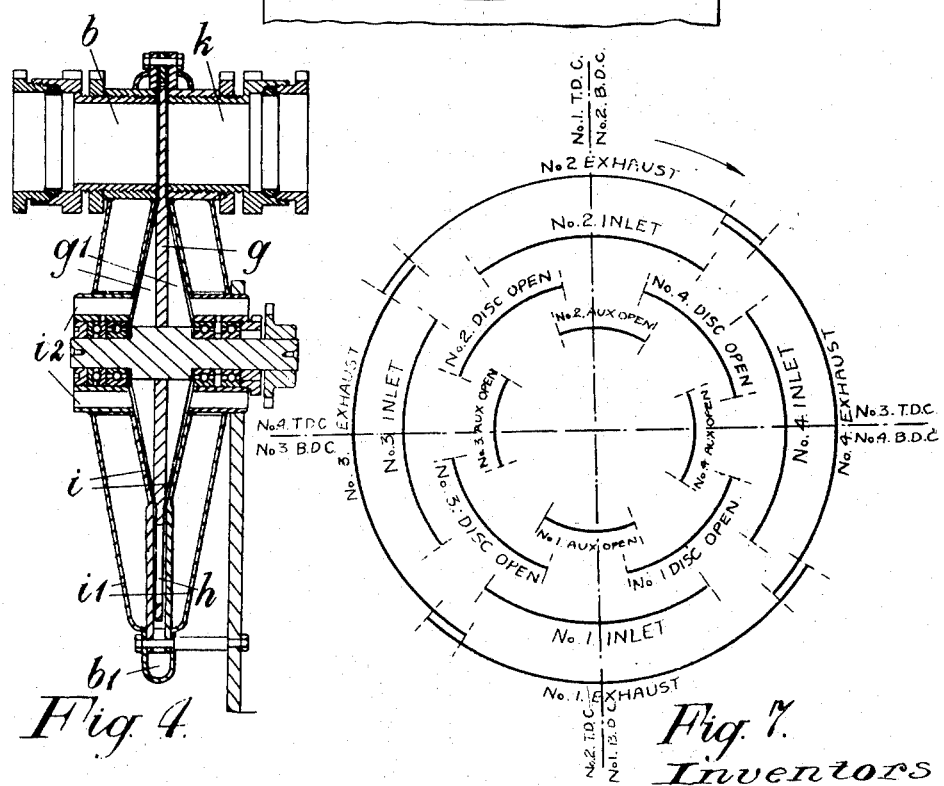
Inventors
W. P. Mansfield
J. White

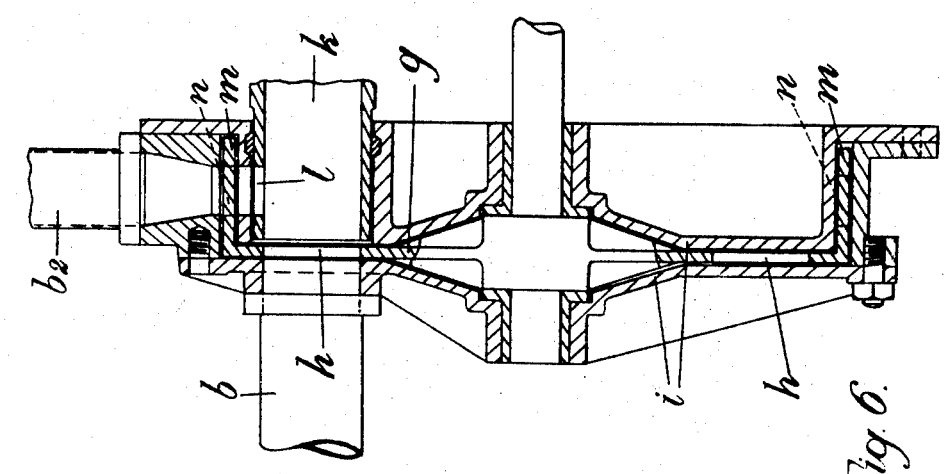
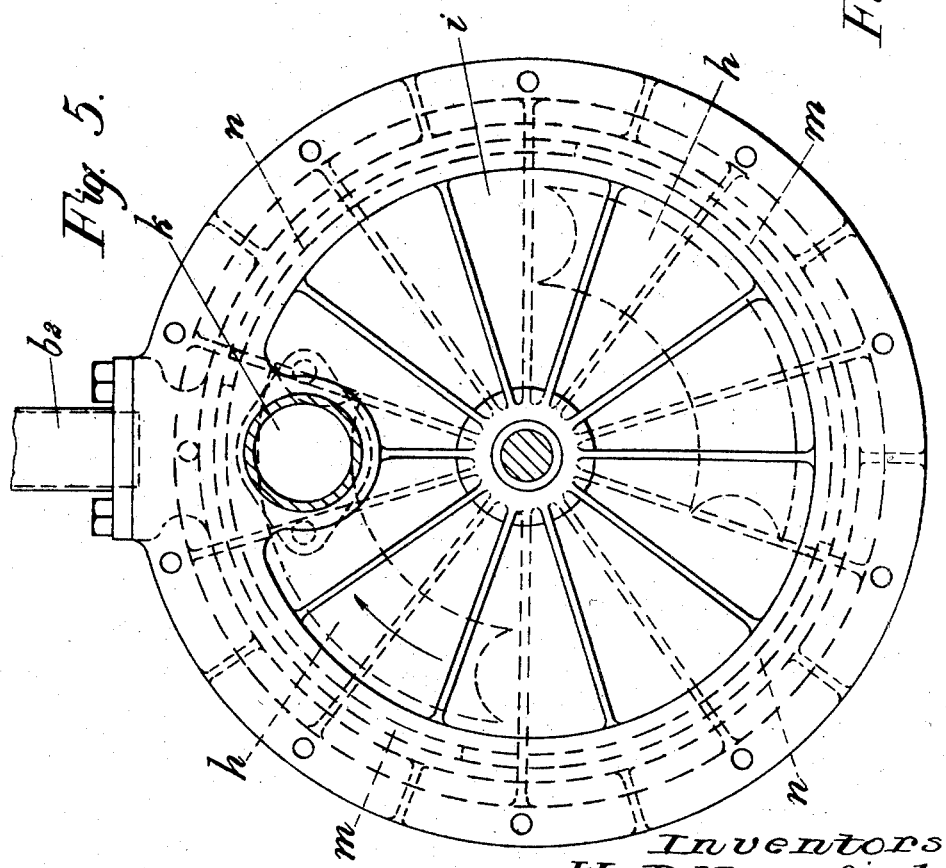

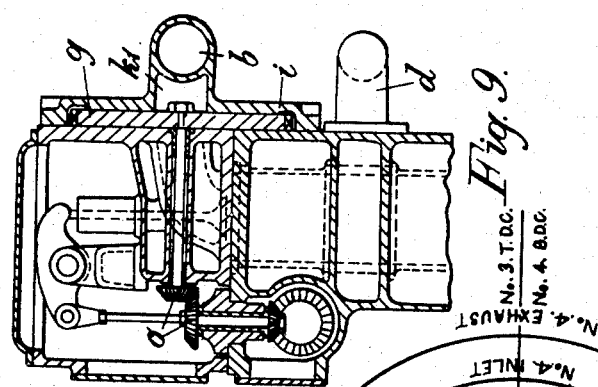
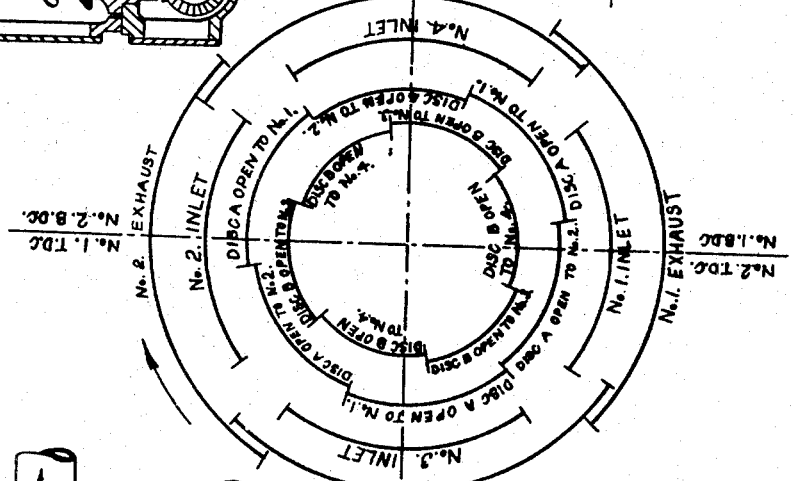
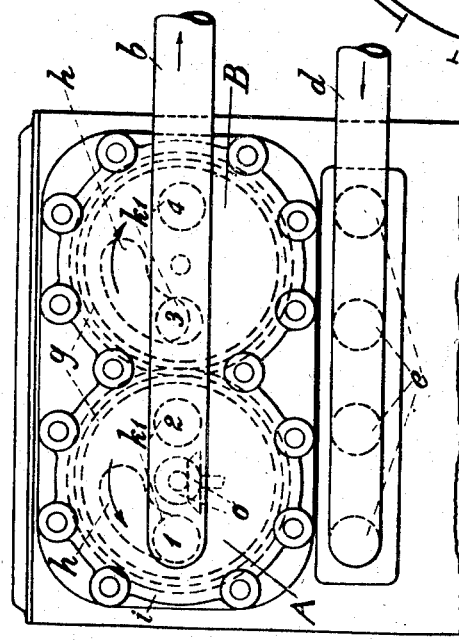
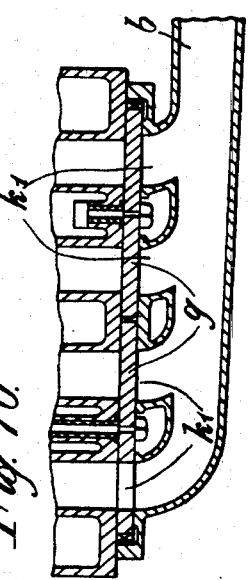

Oct. 2, 1951  W. P. MANSFIELD ET AL  2,570,036
TWO-CYCLE INTERNAL-COMBUSTION ENGINE WITH EXHAUST GAS TURBINE
Filed April 23, 1945  10 Sheets-Sheet 6

Inventors
W. P. Mansfield
J. White
By Hascock & Owning Tuttle
Attys

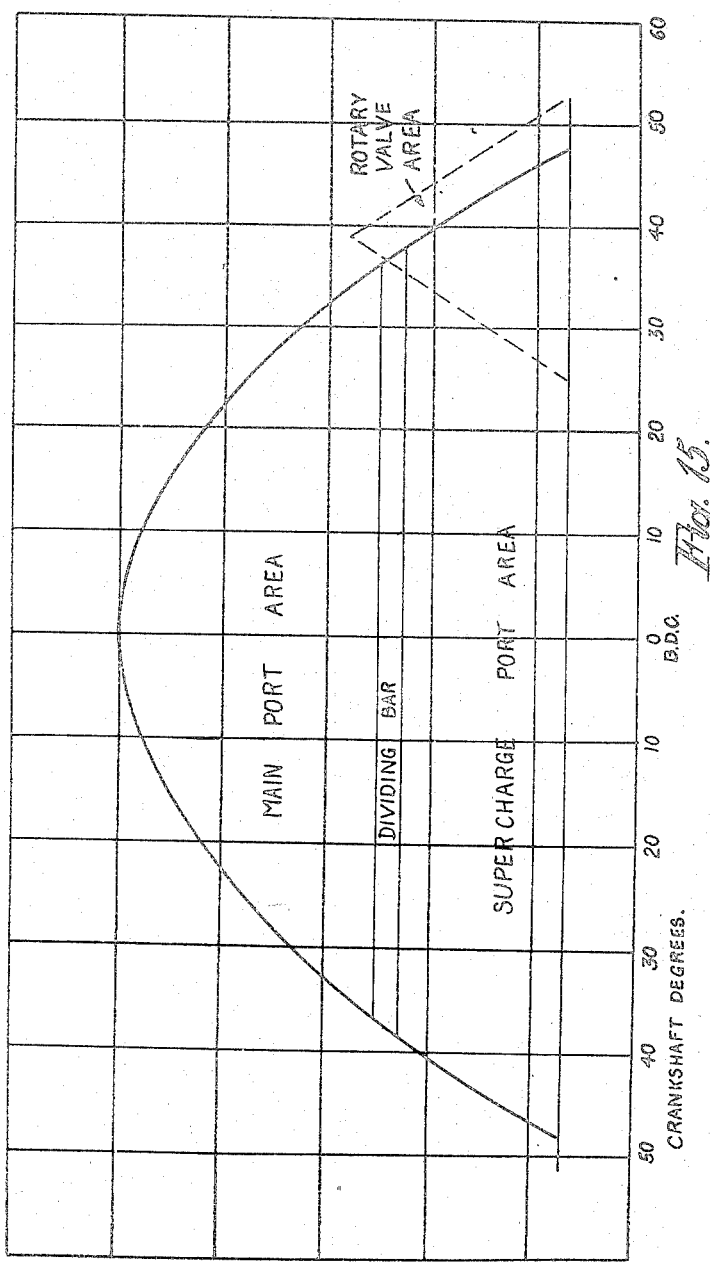

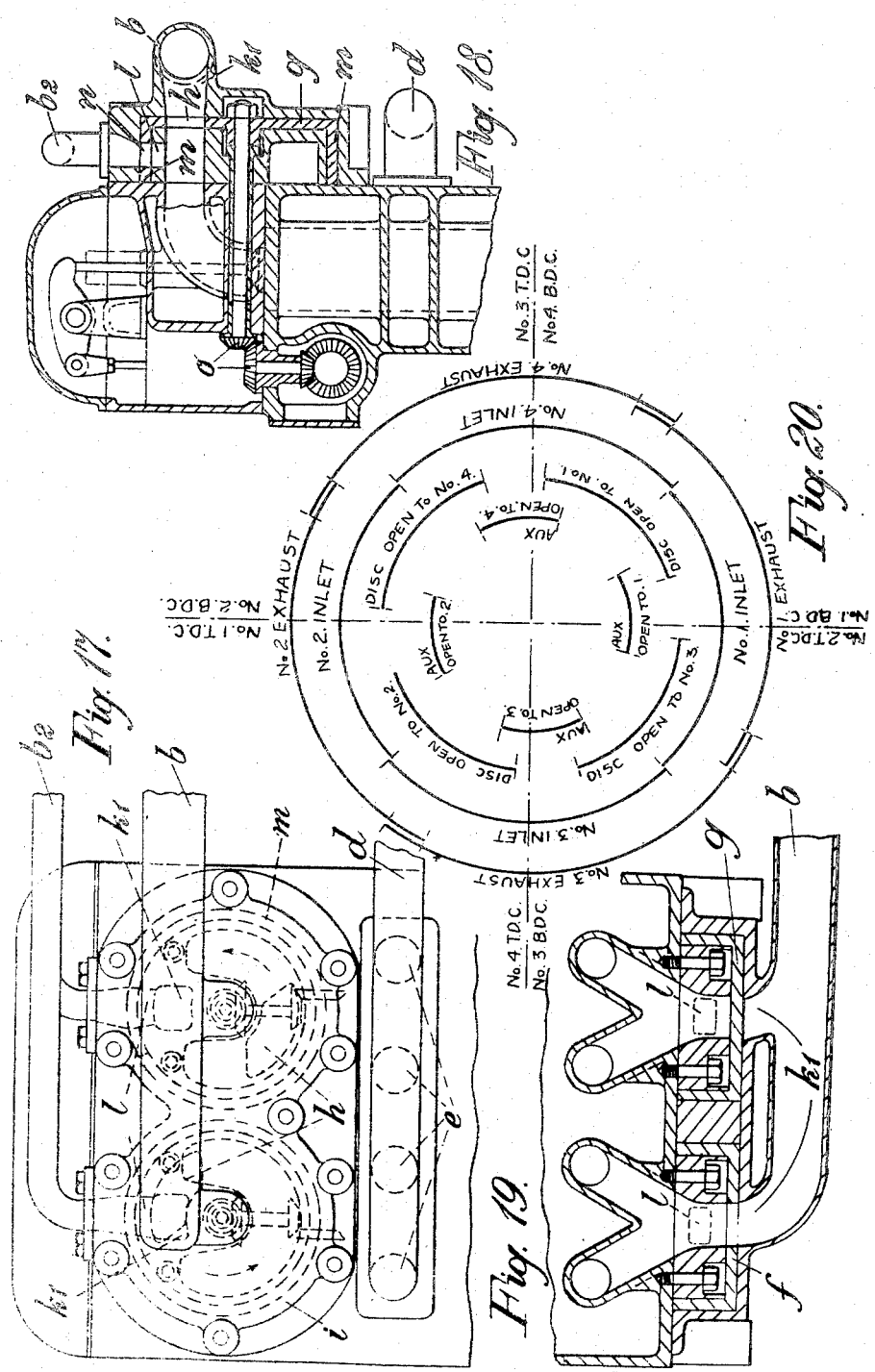

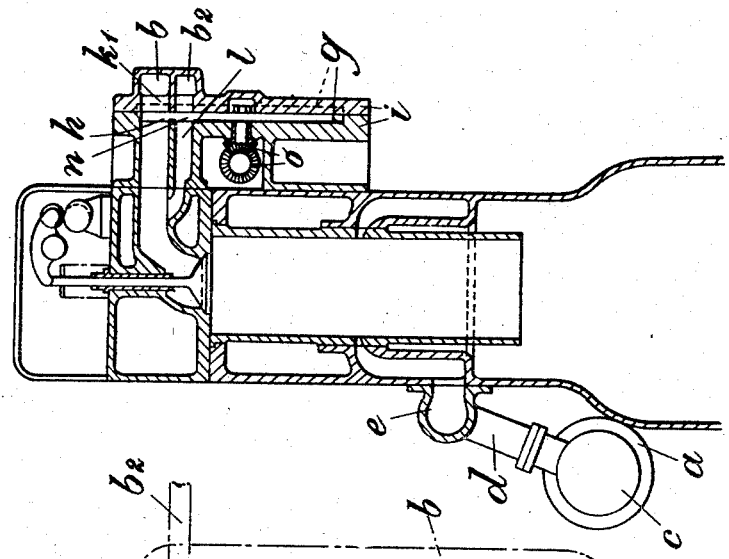
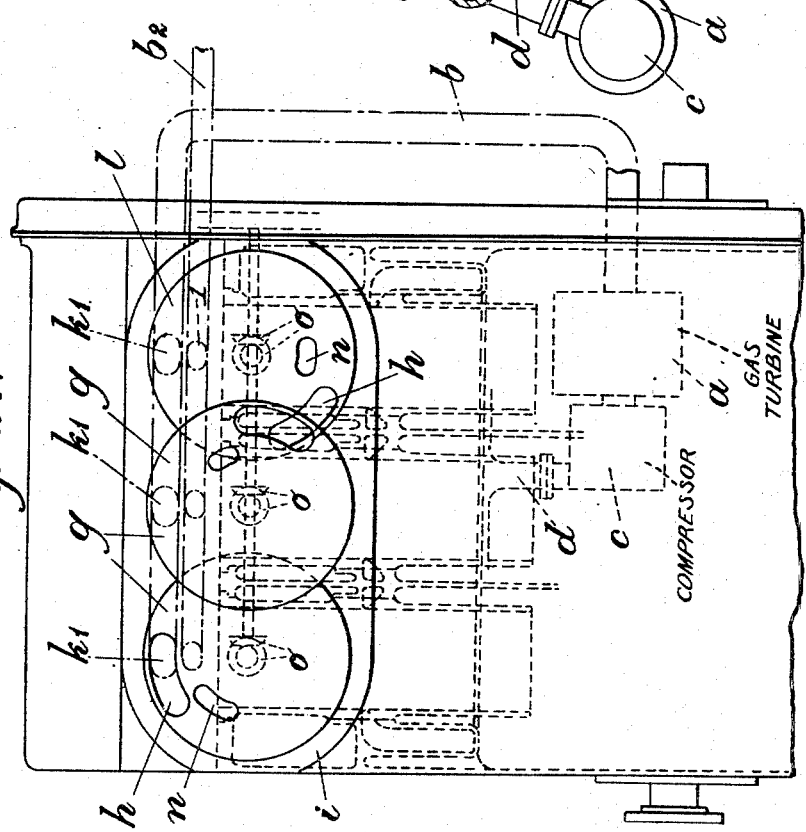

Oct. 2, 1951  W. P. MANSFIELD ET AL  2,570,036
TWO-CYCLE INTERNAL-COMBUSTION ENGINE WITH EXHAUST GAS TURBINE
Filed April 23, 1945  10 Sheets-Sheet 10

Patented Oct. 2, 1951

2,570,036

UNITED STATES PATENT OFFICE 2,570,036

TWO-CYCLE INTERNAL-COMBUSTION ENGINE WITH EXHAUST GAS TURBINE

Wilfred Percival Mansfield and John White, Slough, England, assignors to Michel Kadenacy, Summit, N. J.; Nina K. Guercken executrix of said Michel Kadenacy, deceased Application April 23, 1945, Serial No. 589,853
In Great Britain February 1, 1944

1 Claim. (Cl. 60—13)

This invention relates to two-stroke cycle internal combustion engines, the exhaust gases from which are utilised to drive an exhaust gas turbine which in turn may drive a compressor or compressors for the charging or supercharging medium.

In normal two-stroke cycle internal combustion engines the inlet and exhaust orifices are open at the same time during a large portion of the charging period. In known applications of exhaust gas turbines to this type of engine it has been found necessary to supply the fresh charge at relatively high pressure, and to arrange for the pressure in the exhaust duct during the major portion of the charging period, to be only slightly less than the said supply pressure; approximately the same pressure being obtained in the cylinder when the last orifices close. This means that the whole of the scavenging, charging and supercharging medium must be raised to a relatively high pressure, since the operations take place against a high back pressure, with consequent increase in the work to be done by the compressor and turbine.

When the exhaust orifice of a two stroke internal combustion engine is of the proper size and is opened to a sufficiently large area in a sufficiently small interval and the cross-sectional area of the exhaust duct is of sufficiently large size in relation to the area of the exhaust orifice opened before the inlet orifice opens, an intense solitary pressure wave produced by the energy originally in the cylinder gases moves outwardly through the gases in the exhaust duct. This wave is of finite amplitude, so that it becomes steep fronted, and it travels faster than lesser disturbances, so that its outward motion is unaffected by the presence of any obstruction, such as the inlet to a turbine mounted at the end of the duct, until the front of the wave actually encounters the obstruction.

If the exhaust duct is of the same length as the traveling pressure wave or longer, then when the wave reaches the outer end of the duct, the pressure in the cylinder or in the cylinder and in the duct adjacent the cylinder will have fallen to substantially the initial pressure of the gases, through which the wave has moved during its outward motion, and the pressure of the gases elsewhere within the duct will be at various higher pressures, depending upon the pressure contour of the wave. If the length of the duct is half the length of the moving wave, then when the front of the wave strikes an obstruction, such as the inlet to a turbine, a part of the energy will be reflected toward the cylinder and the head of the reflected portion of the wave will reach the cylinder on its return movement just as the tail end of the original wave is leaving the cylinder in its outward travel. An exhaust duct of half the length of the pressure wave is the shortest length of duct, which will contain the total quantity of gases at high pressure, and, if the cross-sectional area of the duct is the practical minimum, the volume of the gases in the duct will be the smallest possible and the pressure of the gases will be the highest possible for a given arrangement and operating condition of the engine. The gases in the duct are thus in suitable condition for driving the turbine.

The turbine should be of such design that it does not pass all the gas as quickly as it is delivered during the early part of the pressure phase and the turbine inlet thus forms an obstruction, from which reflection takes place.

When the engine and turbine are of the construction and mode of operation described, then, after each exhaust action, there is a zone of high pressure gases adjacent the outer end of the duct, which can be used to drive the turbine, and a zone of low pressure gases in the cylinder or in both the cylinder and the duct adjacent the cylinder, the pressure of the zone of low pressure gases facilitating charging the cylinder.

The present invention, accordingly, resides in a two cycle internal combustion engine installation, including a turbine driven by the exhaust gases from the engine and operating a compressor for charging the engine, the exhaust orifice of the engine and the exhaust duct being so constructed and the orifice being so operated that, after each exhaust action, there is a zone of high pressure in the duct adjacent the outer end of the duct and a zone of low pressure in the duct adjacent the cylinder. In addition, the installation of the invention includes a valve in the duct, which is positively operated to open and permit unobstructed travel through the duct of the pressure wave creating the zone of high pressure and is then closed to separate the zones of high and low pressure.

Further features of the invention will be pointed out in the appendant claim.

Practical applications of the invention will now be described by way of example only with reference to the accompanying drawings, in which:

Figure 3 is an elevation of one form of disc valve, arranged to suit a 3-cylinder engine;

Figure 4 is a cross-sectional elevation of Figure 3;

Figures 5 and 6 are similar views to Figures 3 and 4 showing a disc valve which also controls an auxiliary orifice, and is arranged to suit a 4-cylinder engine.

Figure 7 shows a timing diagram suitable for the engine and valve of Figures 5 and 6.

Figures 8 to 10 show an example of the arrangement in which the disc valves are disposed close to the cylinder and on the face normally provided for the exhaust manifold.

Figure 11 is a timing diagram of the discs of Figures 8 to 10 as applied to a 4-cylinder engine.

Figure 15 shows an area diagram for the engine and rotary valve of Figures 12 and 13.

Figures 17 to 19 are views similar to Figures 8 to 10 showing an alternative arrangement of disc valves arranged close to the cylinders and provided with auxiliary orifices.

Figure 20 is a timing diagram suitable for the engine and valves of Figures 17 to 19.

Figure 21 is a side elevation showing a 3-cylinder engine with disc valves, having main and auxiliary ports, applied thereto.

Figure 22 is a cross-sectional elevation of Figure 21.

Figure 2:
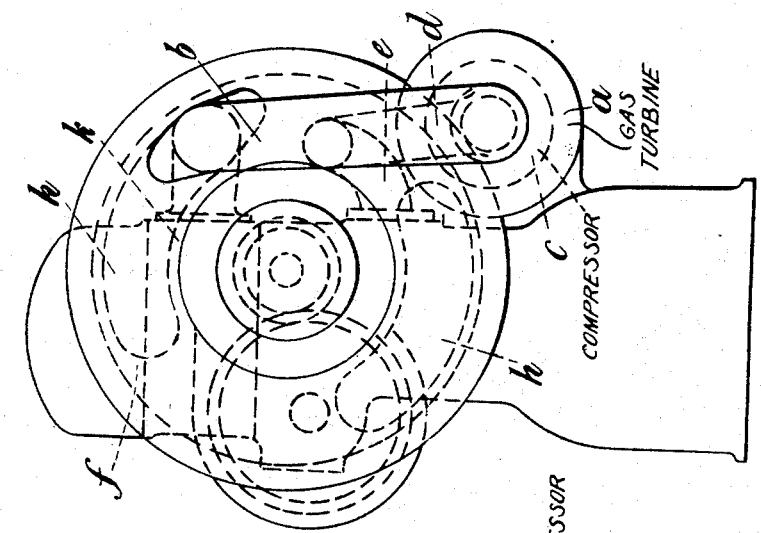
Figure 2 is an end elevation of Figure 1.
Figure 1:
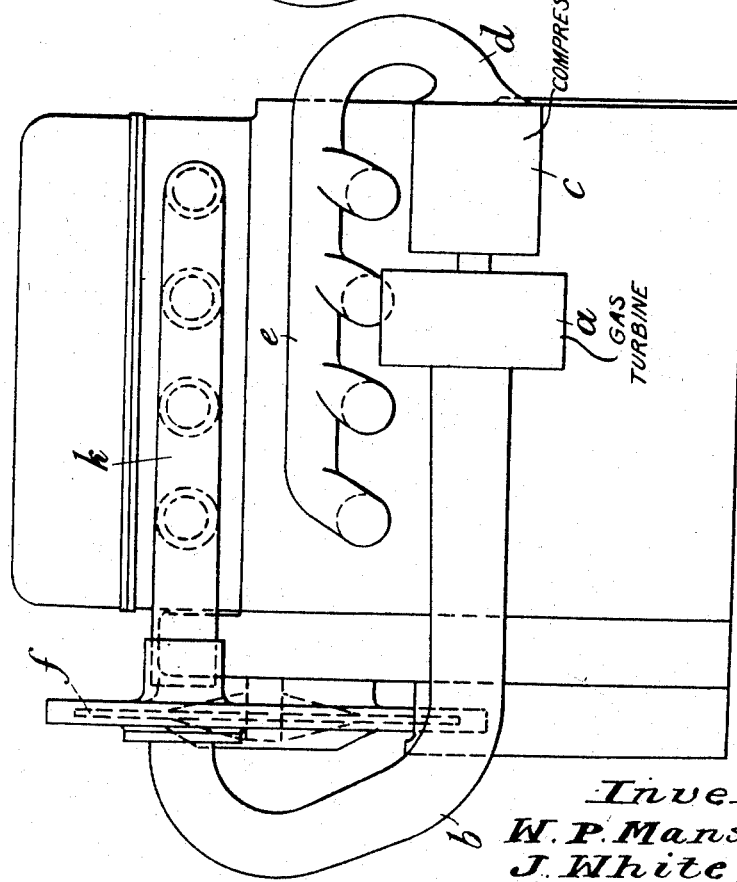
Figure 1 is a side elevation, showing the general arrangement of one form of engine in accordance with the invention.

The mechanical arrangement of the engine may be substantially normal, as shown in Figures 1 and 2, with an exhaust gas turbine $a$ mounted at the end of the exhaust duct $b$, said turbine driving a compressor $c$ for the fresh charge. The turbine and compressor may be of any type suitable for the purpose, in accordance with the arrangements and preferences known in the art. The charging medium will be led from this blower to the cylinders in any suitable manner, as by the duct $d$ and inlet manifold $e$.

The total quantity of fresh charge, passed to the cylinder must be sufficient to charge or supercharge the cylinder to the required pressure and to provide the desired quantity in excess, which not only passes to the exhaust duct, but remains therein at the end of the charging period, and takes no part in the ensuing combustion process. The excess quantity should be of the order of 0.15 to 0.6 cylinder volume at the normal temperature and pressure of the fresh charge.

The extent of the zone of high pressure, and its absolute pressure will depend upon the pressure in the cylinder when the exhaust orifices open, the cross-sectional areas of the duct, and the rate of discharge of the gases from the cylinder, that is, the time area of the exhaust orifices, and their co-efficient of discharge. Furthermore these features should be designed to give the required length to the zone of high pressure which, in conjunction with the design of the turbine inlet, will ensure that pressure gas is delivered to the turbine for a substantial portion of the period between successive exhaust actions. This is more easily accomplished in a multi-cylinder engine, when several cylinders exhaust into one manifold, than in a single cylinder engine. These considerations qualify the earlier statements regarding the obtaining of high pressure gas for driving the turbine and indicate that the absolute maximum time area, or the smallest possible pipe, etc., may not be the most favourable compromise under given conditions.

The conditions which govern the pressure and thus the length of the high pressure zone have been given above and, in applying the present invention, this zone of high pressure should be trapped between the turbine and the valve means arranged in the duct, and shown diagrammatically at $f$ in Figure 1.

Calculation of the length of the high pressure zone is extremely involved and of doubtful accuracy, in view of the many variables present. However, a simple pressure time diagram, taken at the appropriate point in the exhaust duct, will give the time taken for the pressure phase to pass the measuring point and this, with a knowledge of the mean velocity of movement of the action, will enable the approximate length to be estimated with sufficient accuracy for practical purposes.

Such estimate of the length of the high pressure zone, and thus of the exhaust duct, should be based on a mean velocity of 450 to 600 meters per second for the outward and return travel of the pressure wave through the gases. This velocity is dependent upon the energy in the gases when the exhaust orifices open, the time area of the orifices, the shape and form of the orifices, i. e., the orifice co-efficient of discharge, and the areas, shape, and form of the exhaust duct, including bends, etc. Broadly the lower value is applicable to low speed engines having small exhaust area, and the higher value to high speed engines having large exhaust area, but allowance must be made for the other factors mentioned.

Alternatively, the required length of the duct may be determined by providing a restriction at the end of the duct, so that the said pressure time diagram will record the time of the return.

The cross-sectional area of the exhaust duct should be at least equal to and preferably 20% to 50% greater than the area of the exhaust orifices opened before the inlet orifices open. The smaller the cross-sectional area of the duct, provided that it is not so small that it restricts the motion of the gases too greatly, the higher will be the pressure of the gases delivered to the turbine inlet.

The timing of the valve should be such that it is fully open, when the front of the pressure wave traveling through the gases reaches the valve, and it should be closed or substantially closed, when the return action reaches it. In this way the high pressure zone is unaffected in passing through the valve, but is effectively separated from the low pressure zone by the closing of the valve.

Some compromise is necessary here, since if the valve is fully open while the complete pressure zone passes through it, then starts to close, and is fully closed when the return action reaches it, this means that the exhaust duct on the turbine side of the valve must be longer than half the length of the pressure zone by an amount dependent upon the time taken for the valve to close and the velocity of the action. This in turn means that the pressure of the trapped gases will be lower by an amount equivalent to the increase in volume due to the increase in length.

The invention may be applied to several different arrangements of engines, each using the above mentioned features in varying degree.

According to one embodiment of the invention the valve means $f$ in the exhaust duct should be mounted at such a distance from the cylinder that when the valve means closes, the volume of gases trapped at the said low pressure, when compressed to the charging or super-charging pressure, will permit the entry of the required quantity of fresh charge from the cylinder into the duct which it is desirable to retain in the duct at the end of the charging period and to take no part in the ensuing combustion, in addition to the residual low pressure gas scavenged from the cylinder. It will be understood that of necessity the pressure of the fresh charge will be higher than the said low pressure zone in the cylinder and the exhaust duct.

With the above arrangement of the duct it follows that if the valve means in the exhaust duct is closed when the return action from the turbine inlet reaches it, this closure will normally occur after the openings of the inlet orifices. At this time, therefore, fresh charge will have entered the cylinder and scavenging will be in progress, so that the total quantity of gases which still have to pass to the exhaust duct is not one cylinder volume of residual gases plus the desired quantity of fresh charge, but something considerably less. The exact quantity is readily ascertainable in any practical case. Experiments have shown that, under these circumstances, very little mixing occurs between the fresh and foul gases during the short time available, and that such mixing as occurs is limited to a small zone marking the junction between the two masses of gas.

In those circumstances, in which the arrangement described requires an exhaust duct undesirably long or does not give sufficiently accurate control of the quantity of fresh charge passing to exhaust as, for example, engines operating over a wide range of speed and load, an auxiliary orifice leading to the atmosphere may be provided. When the main valve closes to trap the high pressure gases, such an auxiliary orifice should open to permit scavenging at atmospheric pressure and it should close before the next exhaust action occurs and preferably when conditions are suitable, as described, for limiting the fresh charge passing to exhaust to the quantity desired. Such an auxiliary orifice may be provided whenever it is desired to scavenge at atmospheric pressure after closure of the main orifice of the valve in the exhaust duct.

If desired, the valve means may be mounted close to the cylinder so that the volume between it and the cylinder is equal to the quantity of charge which it is desired should remain in the exhaust duct at the end of the charging period.

It will be appreciated that, in addition to the various arrangements for controlling the escape of fresh charge to the exhaust duct, there is also the normal control of the exhaust orifices, which, by suitable timing, can be adapted to assist in the desired result, for example, an early closure of the exhaust orifices will reduce the possibility of fresh charge penetrating into the exhaust duct.

Measurement of the pressure and quantity of the charge supplied to the cylinder, and of the pressure and purity of the charge in the cylinder when the last orifice closes, will indicate the degree of successful application of the above features, but more detailed information can be obtained from pressure diagrams and analyses of strobometrically obtained gas samples taken adjacent the cylinder orifices and the valve means in the exhaust duct.

The position of the valve means $f$ in the exhaust duct has been defined in relation to the cylinder, and its position in relation to the turbine should be such that the length of the duct $b$ between them is substantially half the length of the pressure wave.

The duct $b$ may be lengthened to permit greater freedom in the timing of the closure of the valve means or to trap a larger volume of gas at lower pressure, if this is more suitable for driving the turbine, but these are practical compromises which can be decided when the principal characteristics of the turbine and engine are known. With a very moderate degree of supercharging the loss of fresh charge to the exhaust duct, even without the measures described above, and neglecting the benefit to the driving of the turbine, is not so serious as to make the engine and turbine set very inefficient or even uneconomic, since the control effected by the closure of the exhaust orifices is reasonably satisfactory. As the supercharging pressure is raised, however, the quantity of fresh charge which, with any given timing and arrangement of the engine, passes to the exhaust duct, increases rapidly, and the measures described above are necessary to prevent excessive loss of charge, if the increased efficiency due to low pressure scavenging and charging is to be obtained.

The timing of the exhaust and inlet orifices of the cylinder may be based on normal considerations. In all those cases in which the escape of more than the desired quantity of fresh charge has been effectively prevented by the arrangements already described, it is not necessary to close the exhaust orifices so early that it involves mechanical or other difficulties. The closure of the inlet orifices has thus become substantially independent of the exhaust orifices, and they should close when the cylinder has been fully charged to the pressure of supply.

When relatively high pressure gas has been trapped between the cylinder and the valve means, following the supercharging of the cylinder, the valve means in the exhaust duct should open sufficiently early to pass such pressure gas to the duct leading to the turbine, so that the pressure in the duct has time to fall to substantially atmospheric before the next exhaust action occurs.

In certain circumstances and particularly in multi-cylinder engines, the said trapped gases may provide some assistance in driving the turbine. Assuming that re-opening is permissible in relation to the other considerations already specified, the valve means should re-open when the pressures on the two sides of the valve are substantially equal.

The valve means in the exhaust duct, for separating the high pressure zone from the low pressure zone, may take the form of a simple rotating disc valve driven from the engine at engine speed or at any suitable multiple or sub-multiple thereof. The duct from the exhaust orifices will lead to one face of the disc, and the duct to the turbine will be led away from the other face.

Ports or orifices provided in the disc will be designed to give the required open and closed periods.

Any other type of valve may be used which gives the specified opening and closing characteristics.

Figures 3 and 4 show a simple type of valve that may be employed with advantage. As applied to a three-cylinder engine, it consists of a disc $g$, rotating at three times engine speed and having ports $h$ to give the timing required. The disc is located in a housing $i$, which in this example is water cooled, the water being contained in the outer casing $i_1$, which is connected to the engine cooling system. The exhaust manifold $k$, leads to one face of the disc, and the exhaust duct $b$ to the turbine leads away from the other face. It is not necessary for the valve to provide an air-tight joint or even to be in contact with the housing, since the quantity of gas which can leak past the valve in the short time available will not be serious, even if the gas is at high pressure. Nevertheless the working clearances should be maintained as small as possible.

The holes $i_2$ in the casing $i$ permit air to enter the said casing, and the vanes $g_1$ on the disc $g$ acting as a centrifugal fan, pass the air outwards to cool the disc and confine the exhaust gas, which has leaked past the disc, to the periphery thereof, where it may be collected in the pipe $b_1$, and conveyed to the atmosphere or silencer.

Figures 5 and 6 show a similar type of valve to that shown in Figures 3 and 4, but arranged to suit a 4-cylinder engine and to control an auxiliary orifice to atmosphere or the silencer as described above. In the construction shown, the valve disc $g$ is mounted for rotation in a housing $i$ and the exhaust manifold $k$ leads to one face of the disc and the exhaust duct $b$ leads from the other face of the disc to the turbine. The exhaust manifold $k$ is provided with an auxiliary orifice $l$, which is controlled by a flange $m$ secured to or formed with disc $g$. The disc has ports $h$ to permit the passage of exhaust gases from the exhaust manifold $k$ to the exhaust duct $b$ and the flange $m$ has ports $n$, through which gases may escape from the manifold through orifice $l$ and through a pipe $b_2$ leading to atmosphere or a conventional silencer. The disc rotates at twice engine speed.

Figure 7 shows a suitable timing diagram for the engine of Figures 5 and 6.

The said rotating disc valve may be mounted at the front or rear end of the cylinder block with the exhaust manifolds brought forward or backwards, respectively, into the housing surrounding said disc valve. More than one manifold may be controlled by the same disc valve provided that they are spaced at the necessary angular separation, or the orifices in the disc valve are positioned and designed to give the correct timing. The disc valve may be driven in any suitable way, for example, from the crank-shaft or camshaft of the engine.

Alternatively the disc valve may be mounted parallel to the crankshaft axis, i. e., at the side, or top, etc. of the engine and control the outlets from the exhaust manifolds, or the individual exhaust outlets, as they leave the cylinder block. Any number of disc valves may be used, and in this embodiment a right angled drive from one of the engine shafts will be necessary.

This latter alternative is favorable when it is desired to mount the rotating disc valves close to the cylinder. For example the disc valve or valves may be mounted on the side of the cylinder block or head, along the face normally provided for mounting the exhaust manifold. Each individual exhaust outlet may be controlled by a disc valve pivoted above or below it, or two outlets may be controlled by a disc valve pivoted between them. The peripheries of the separate disc valves could be formed as gears to convey the drive along the train of valves.

Figures 8 to 10 show two disc valves A, B arranged in this manner, each controlling the outlets from two cylinders. Each valve comprises a disc $g$ having ports $h$ and is disposed within a housing $i$. The right angled drive to one of the discs is shown at $o$ and the discs are formed with meshing teeth at their peripheries, so that both discs may be rotated in unison. The branches $k_1$ of the exhaust manifold are on the turbine side of the discs and the exhaust duct $b$ leads from the manifold. The intake duct is shown at $d$ leading to branches $e$ of the inlet manifold. Valve A controls the outlet from cylinders numbers 1 and 2 and valve B controls the outlet from cylinders 3 and 4. The small diameter discs run at 3 times engine speed, so that each disc valve opens to its connected cylinders 3 times per cycle, although only one opening is required. However, during the extra openings the cylinder valves are closed, so that no serious interference with the pressure cycle occurs, although a little additional volume has been added to the exhaust manifold. These additional and unnecessary openings are, of course, occasioned by the high speed of the disc, which in turn is required to give the desired rapid opening and closing with a small diameter disc.

Figure 11 shows a timing diagram for the engine of Figures 8 to 10. The arrangement shown in Figs. 17–19 includes a pair of discs $g$ separately driven at twice engine speed through gearing $o$. Each disc is mounted within a housing $i$ and has ports $h$. Each disc also has flange $m$ controlling an orifice $l$ in the side of the exhaust manifold branch $k_1$, the flange having ports $n$, through which orifice $l$ may be connected to pipe $b_2$ leading to atmosphere or a silencer. The passages leading from a pair of exhaust valves join before they reach the disc valve and the exhaust manifold branches $k_1$ are on the turbine side of the disc and connected to exhaust duct $b$. An inlet duct $d$ leads to branches $e$ of the inlet manifold.

Figure 20 shows a suitable timing diagram for the engine of Figures 17 to 19. This timing diagram, Figure 20, may be used with the engine of Figures 4 and 5, while the timing diagram, Figure 7, may be used with the engine of Figures 17 to 19.

Figure 7 shows a short inlet period with the auxiliary orifice remaining open until near the end of the inlet period, while Figure 20 shows a longer inlet period with the auxiliary orifice closing some time before inlet closure, with a view to assisting the pressure in the cylinder to build up to the full charging pressure.

Figure 23:
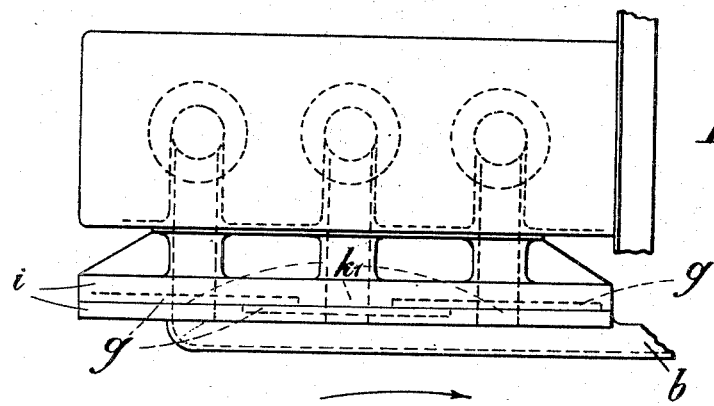
Figure 23 is a plan.

Figures 21–23, inc., show an arrangement for use with a three-cylinder engine with the disc valves arranged close to the cylinders and overlapping. The three discs $g$ are mounted within a housing $i$ and are provided with ports $h$ and other parts $n$. The discs are individually driven through gearing $o$. Each exhaust passage from a cylinder is sub-divided to provide a main orifice controlled by the part of a disc containing port $h$, and an auxiliary orifice $l$ controlled by the part of the disc containing port $n$. The main orifice is connected through exhaust manifold branch $k_1$ and the manifold to duct $b$ leading to the intake of turbine $a$ driving compressor $c$. The outlet of the compressor is connected through pipe $d$ to the inlet manifold $e$. The auxiliary orifices $l$ are connected to pipe $b_2$ leading to atmosphere or a silencer. The discs are rotated at engine speed.

Figure 24:
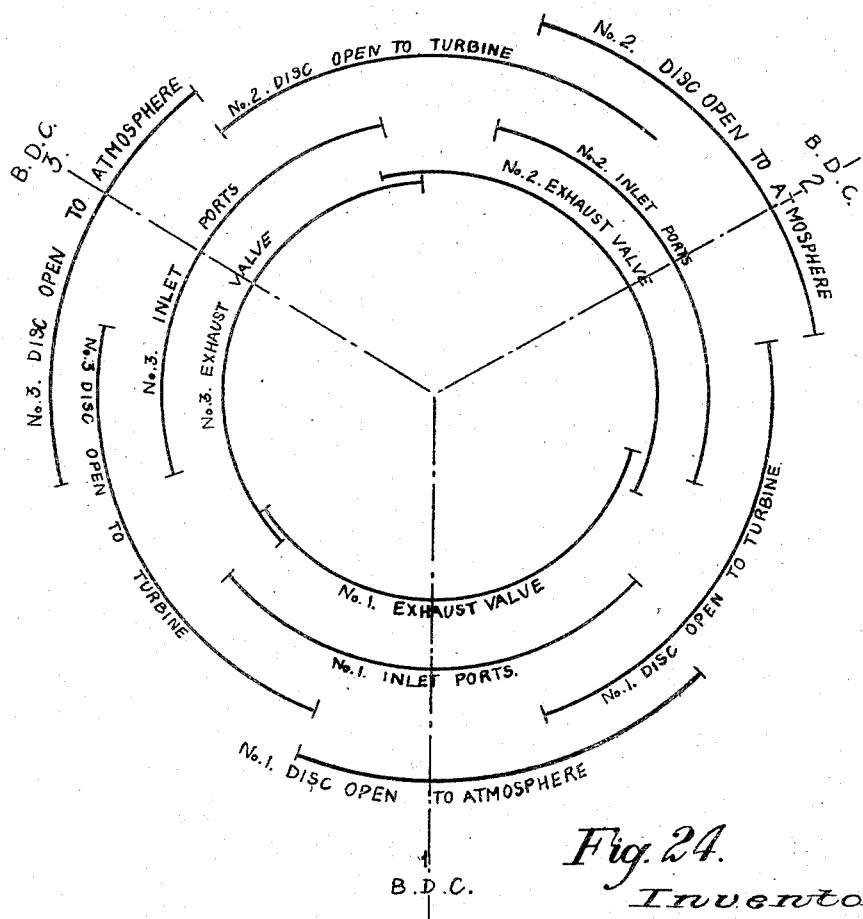
Figure 24 shows a suitable timing diagram for the engine and valves of Figures 21 to 23.

Figure 24 is a timing diagram suitable for the engine of Figures 21 to 23.

The design of any of the above described rotating disc valves presents no great difficulties, since no part is subjected to the high temperature of exhaust for more than a small portion of the cycle. The slice of exhaust gases removed by the thickness of the disc as the orifices close, may be led to the atmospheric discharge pipe $b_2$ when fitted.

In applying the invention to multi-cylinder engines, the exhaust from one cylinder must not raise the pressure in the exhaust branch of the preceding cylinder at a time when low pressure is desired therein to facilitate scavenging and charging of the said preceding cylinder. If the charging period of the cylinders is of the order of 120°, then not more than 3 cylinders should exhaust into the same duct, while if the charging period is of the order of 90 degrees, then 4 cylinders may exhaust into the same duct. Nevertheless some small overlap of the exhaust periods is advantageous since the increase in pressure due to the following cylinder exhausting, raises the pressure in the exhaust branch of the preceding cylinder and tends to pass back to that cylinder some of the charge which has passed through into the said exhaust branch, thus assisting in supercharging the cylinder. Such action must occur towards the end of the charging period of the preceding cylinder, and the volume of fresh charge contained in the exhaust passage and branch should be sufficient to prevent the entry of foul gas into the said preceding cylinder.

The design of the turbine, in conjunction with the actions in the pipe, should be such that, for normal operating conditions of the engine, the turbine passes the pressure gas at a rate which ensures that the pressure in the duct falls to substantially atmospheric pressure, prior to the arrival of the next outwardly moving wave or pressure phase.

It will be appreciated that as the mean effective pressure of the engine is increased, the pressure in the cylinder when the exhaust orifices open will also increase, so that higher pressure gases will be available for driving the turbine, and thus enable the compressor to provide a higher supercharging pressure to support a still further increased M. E. P. until the optimum for the engine, due to other causes, is reached.

Figure 12:
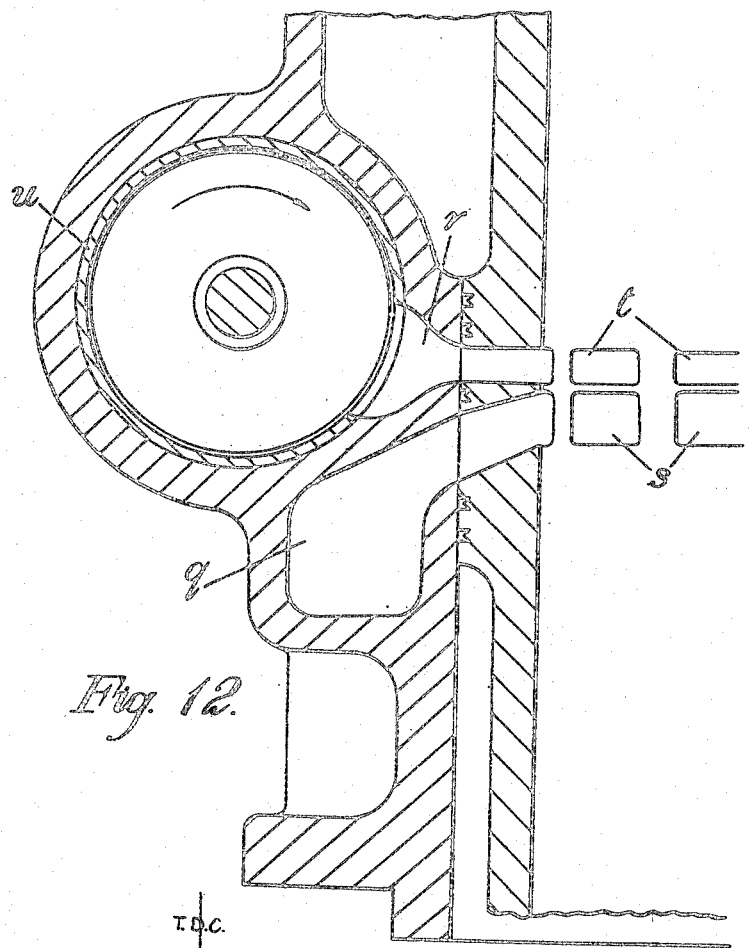
Figure 12 is a view showing an arrangement of two-pressure charging, the high pressure supercharge being controlled by a rotary valve.
Figure 14:
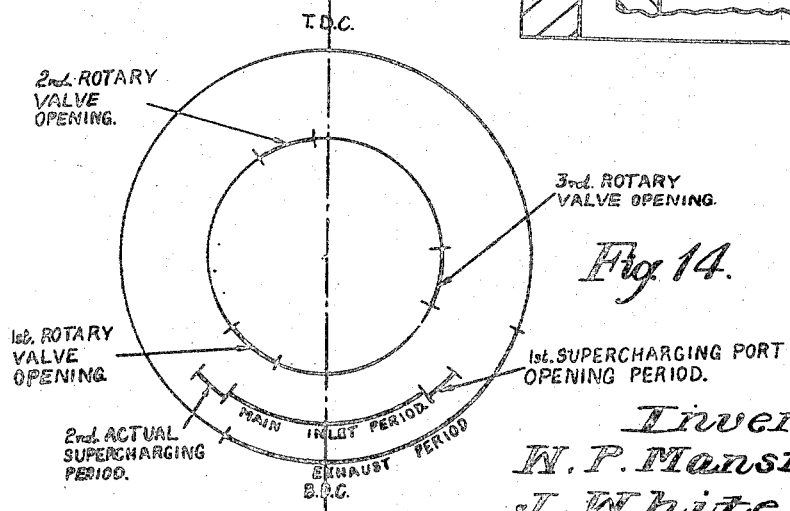
Figure 14 shows the timing diagram for the engine and rotary valve of Figures 12 and 13.
Figure 13:
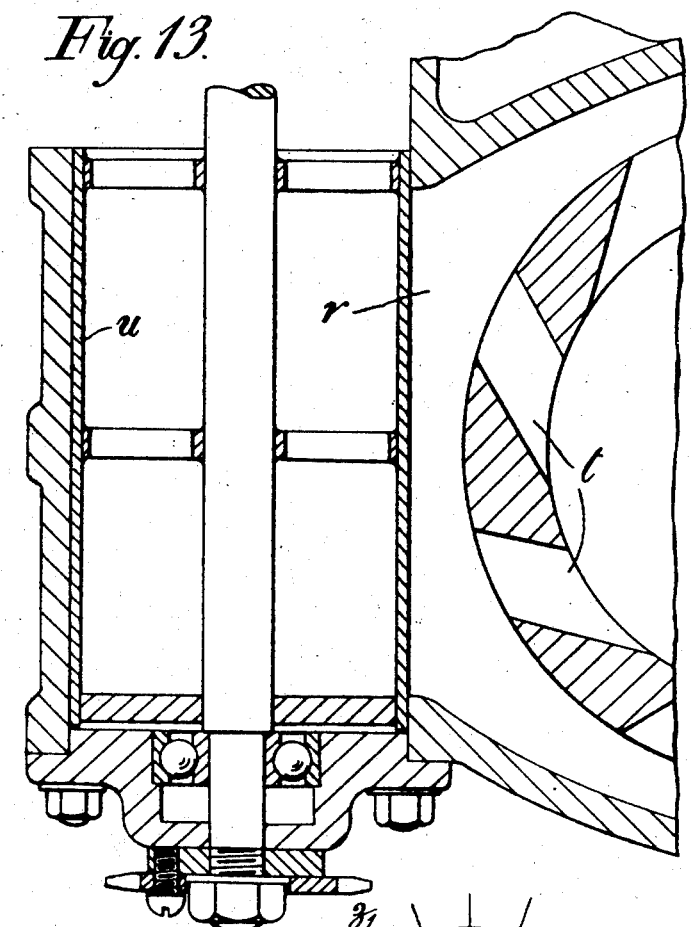
Figure 13 is a sectional plan of the rotary valve shown in Figure 12, and can be extended to cover any number of cylinders.
Figure 16:
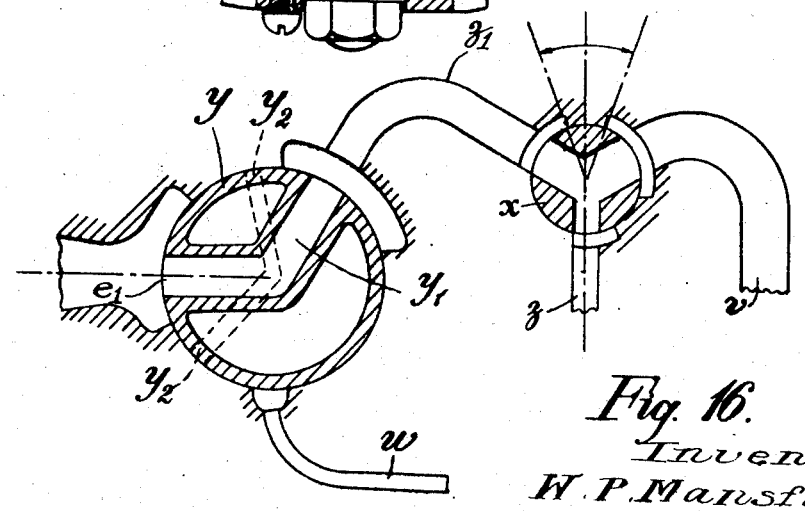
Figure 16 is a diagrammatic view showing an arrangement of rotary valve controlling supply of low pressure and high pressure air to one set of inlet ports, and a distributor valve controlling the supply of low pressure air from the low pressure blower to the engine and to a high pressure blower.

According to a further embodiment of the invention, shown in Figures 12 and 13, the fresh charge may be supplied to the cylinder at two different pressures, viz., a relatively low pressure at $q$ for charging and a relatively high pressure at $r$ for supercharging. The charging medium may be supplied from $q$ through the normal inlet orifices $s$ at low pressure, since, due to the gaseous actions in the duct and to the trapping of the high pressure zone by the valve means, the cylinder, and the duct between the cylinder and the valve means, are at a low pressure during these operations. The separate supply of supercharging medium at relatively high pressure from $r$ may be admitted to the cylinder through any desired valve means. For example, separate orifices $t$ may be provided in the cylinder walls above the normal ports $s$, and may be controlled by valve means in the inlet duct, e. g., a rotary valve $u$, in addition to the normal, e. g., piston, control of the inlet orifices. The rotary valve may pass at three times engine speed and the supercharging medium may be supplied through the centre of the tubular valve $u$. Figure 14 shows a timing diagram and Figure 15 an area diagram for the arrangement shown in Figures 12 and 13.

According to a further alternative, both the low pressure and high pressure charging medium may be supplied to the cylinder through the normal inlet orifices and be controlled by valve means in the inlet duct, either a single valve means controlling both charges, or a separate valve means controlling each charge. It should be appreciated that with even moderately high pressure supercharging a considerable gain in efficiency may be obtained by supplying the charge at two pressures, assuming that the additional complication and increased first cost are justifiable. Supplying the fresh charge at two or more pressures is a compromise towards the ideal cycle of supplying the supercharge at gradually increasing pressure.

It is to be understood that whenever the expression "turbine" is used herein, it is intended to cover any other form of prime mover which may be associated with a two-stroke cycle internal combustion engine to be driven by the exhaust gases therefrom.

Moreover, in place of using the turbine to drive a compressor or compressors, it may be used to drive a machine or other device, or may merely return its output to the main engine.

We claim:

In an engine installation, the combination of a two cycle internal combustion engine having a cylinder provided with inlet and exhaust orifices, means for opening and closing the orifices, said means opening the exhaust orifice ahead of the inlet orifice, an exhaust duct connected to the exhaust orifice, a turbine having an inlet connected to the outer end of the exhaust duct, a compressor driven by the turbine and having its outlet connected to the inlet orifice of the cylinder to charge the latter, a valve in the exhaust duct operable to provide an unobstructed passage through the duct and to close the duct, means for positively operating the valve, the exhaust duct having a cross-sectional area at least equal to the area of the exhaust orifice opened when the opening of the inlet orifice starts and the exhaust orifice being opened to such an extent in so short an interval that, upon each opening of the exhaust orifice, a wave of high pressure travels outwardly through the duct, the valve being disposed in the duct at a distance from the turbine equal to approximately half the length of the pressure wave and being operated to be fully open, when the front of the outwardly moving wave reaches the valve, and to be substantially fully closed, when the front of the wave reflected from the turbine inlet reaches the valve, the valve being disposed at such a distance from the cylinder, that the portion of the duct between the cylinder and valve has sufficient capacity to contain the volume of low pressure gases trapped between the cylinder and valve upon closing of the valve, when said gases are compressed to the pressure of the charge admitted to the cylinder, plus the amount of fresh charge desired to be passed from the cylinder into the duct and retained at the end of the charging period plus the residual low pressure gas scavenged from the cylinder.

WILFRED PERCIVAL MANSFIELD.
JOHN WHITE.

REFERENCES CITED

The following references are of record in the file of this patent:

UNITED STATES PATENTS

| Number | Name | Date |
| --- | --- | --- |
| 2,102,559 | Kadenacy | Dec. 14, 1937 |
| 2,130,721 | Kadenacy | Sept. 20, 1938 |
| 2,131,958 | Kadenacy | Oct. 4, 1938 |
| 2,216,074 | Garve et al. | Sept. 24, 1940 |

FOREIGN PATENTS

| Number | Country | Date |
| --- | --- | --- |
| 74,526 | Austria | Aug. 26, 1918 |